(12) United States Patent
Patel et al.

(10) Patent No.: US 8,581,466 B2
(45) Date of Patent: Nov. 12, 2013

(54) KNURLED MULTIPLE CONDUCTOR WINDINGS

(75) Inventors: Dhaval Patel, Loves Park, IL (US); Gordon W. Friske, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 188 days.

(21) Appl. No.: 12/870,263

(22) Filed: Aug. 27, 2010

(65) Prior Publication Data

US 2012/0049671 A1  Mar. 1, 2012

(51) Int. Cl.
*H02K 3/28* (2006.01)
*H02K 3/04* (2006.01)
*H02K 15/085* (2006.01)
*H02K 15/00* (2006.01)

(52) U.S. Cl.
USPC ............. 310/201; 29/596; 29/606; 310/71; 310/180; 310/184

(58) Field of Classification Search
USPC ............ 310/180, 184, 201, 71, 179; 29/596
See application file for complete search history.

(56) References Cited

U.S. PATENT DOCUMENTS

| | | | |
|---|---|---|---|
| 3,192,423 A * | 6/1965 | Pearson | 310/201 |
| 3,688,236 A | 8/1972 | Boaz et al. | |
| 3,735,088 A | 5/1973 | Hall | |
| 5,022,581 A * | 6/1991 | Zimmer | 228/164 |
| 5,507,528 A * | 4/1996 | Mastrosimone | 285/22 |
| 6,091,168 A | 7/2000 | Halsey et al. | |
| 6,249,956 B1 * | 6/2001 | Maeda et al. | 29/596 |
| 6,483,220 B1 | 11/2002 | Johnsen | |
| 6,557,239 B2 * | 5/2003 | Takahashi et al. | 29/596 |
| 6,624,544 B2 * | 9/2003 | Higashino et al. | 310/201 |
| 6,784,583 B2 * | 8/2004 | Umeda | 310/179 |
| 6,971,153 B2 * | 12/2005 | Tokizawa et al. | 29/596 |
| 7,005,773 B2 * | 2/2006 | Nakamura | 310/180 |
| 7,057,318 B2 | 6/2006 | Strobl et al. | |

(Continued)

FOREIGN PATENT DOCUMENTS

| | | |
|---|---|---|
| EP | 0140012 A1 | 5/1985 |
| EP | 0533741 B1 | 10/1994 |
| EP | 1868286 A2 | 12/2007 |
| WO | 2006/064860 A1 | 6/2006 |

OTHER PUBLICATIONS

D.Johnson, et al. "Principles of Brazing", pp. 83-90, 2005.*
http://www.silvaloy.com/alloy_selection.php 2013.*

(Continued)

*Primary Examiner* — Burton Mullins
(74) *Attorney, Agent, or Firm* — Carlson, Gasky & Olds, P.C.

(57) ABSTRACT

An example electric machine includes a stator disposed about an axis having a plurality of slots. The electric machine also includes a plurality of windings each having a first portion and a second portion. At least two of the plurality of windings are at least partially disposed within each of the plurality of slots. At least one of the first portion or second portion of at least one of the plurality of windings of each slot includes a first exposed end with a surface having a plurality of grooves, the surface in contact with a second exposed end of at least one other winding of the same slot. The first exposed end and second exposed end form a joint between the plurality of windings. A braze material is dispersed in a plurality of grooves disposed between the first exposed end and the second exposed end.

30 Claims, 10 Drawing Sheets

(56) References Cited

U.S. PATENT DOCUMENTS

| | | | |
|---|---|---|---|
| 7,126,245 B2* | 10/2006 | Even et al. | 310/179 |
| 7,262,537 B2 | 8/2007 | Worley et al. | |
| 7,268,455 B2* | 9/2007 | Kouda et al. | 310/184 |
| 8,129,876 B2* | 3/2012 | Bresney | 310/54 |
| 8,436,506 B2* | 5/2013 | Wang et al. | 310/260 |
| 2004/0195926 A1 | 10/2004 | Hiwaki et al. | |
| 2006/0114002 A1* | 6/2006 | Sukeda et al. | 324/538 |
| 2010/0102664 A1 | 4/2010 | Chen et al. | |
| 2012/0038230 A1* | 2/2012 | Kurahara et al. | 310/71 |

OTHER PUBLICATIONS

Johnson Matthey "Metal Joining" catalogue, 1999 Q3, http://www.jm-metaljoining.com/pdfs/Silver%20Brazing%20Alloys%20and%20Fluxes.pdf.*

D. Jacobson et al. "Principles of Brazing", p. 24, 2005.*

* cited by examiner

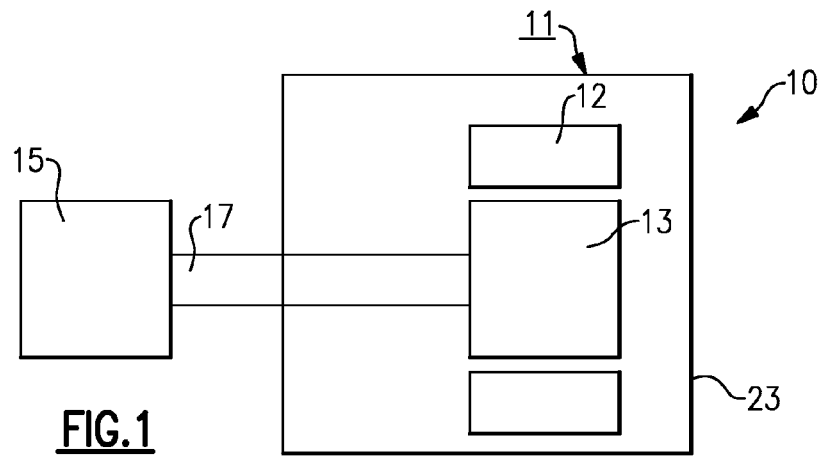
FIG. 1
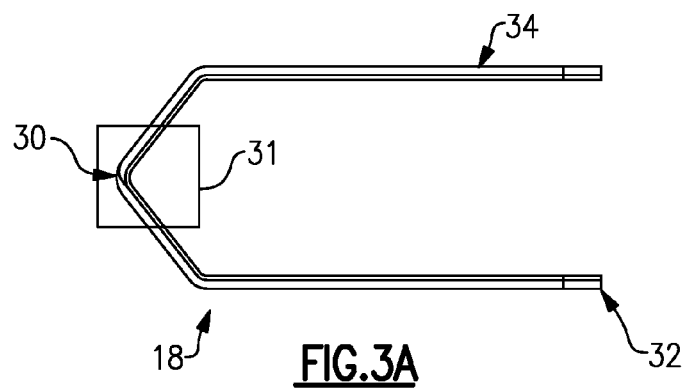
FIG. 3A
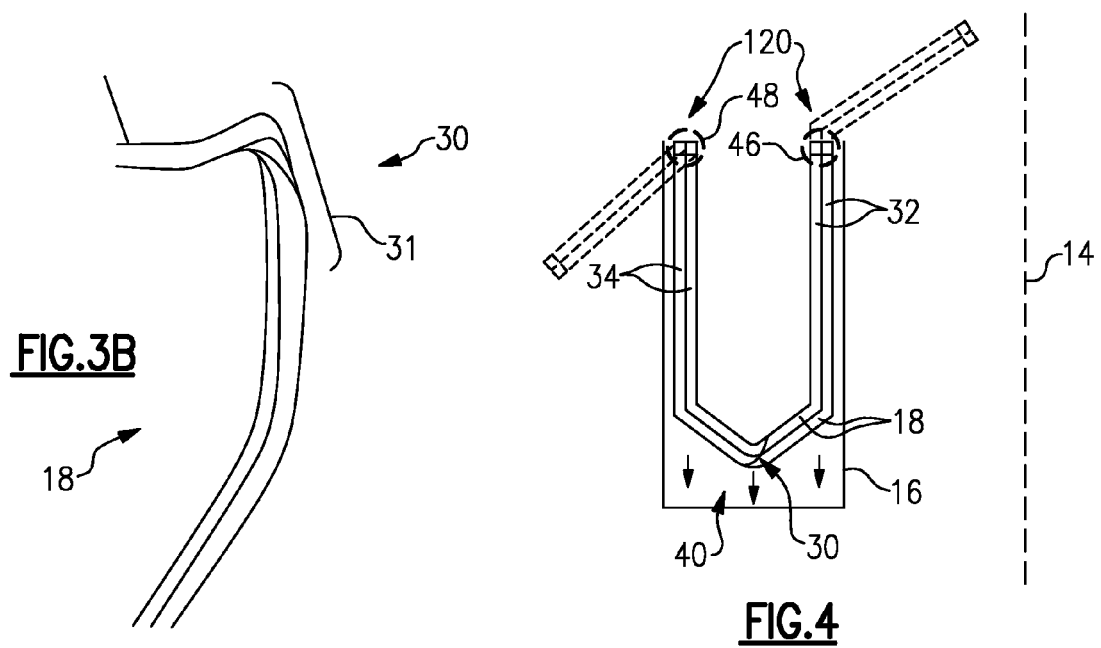
FIG. 3B
FIG. 4

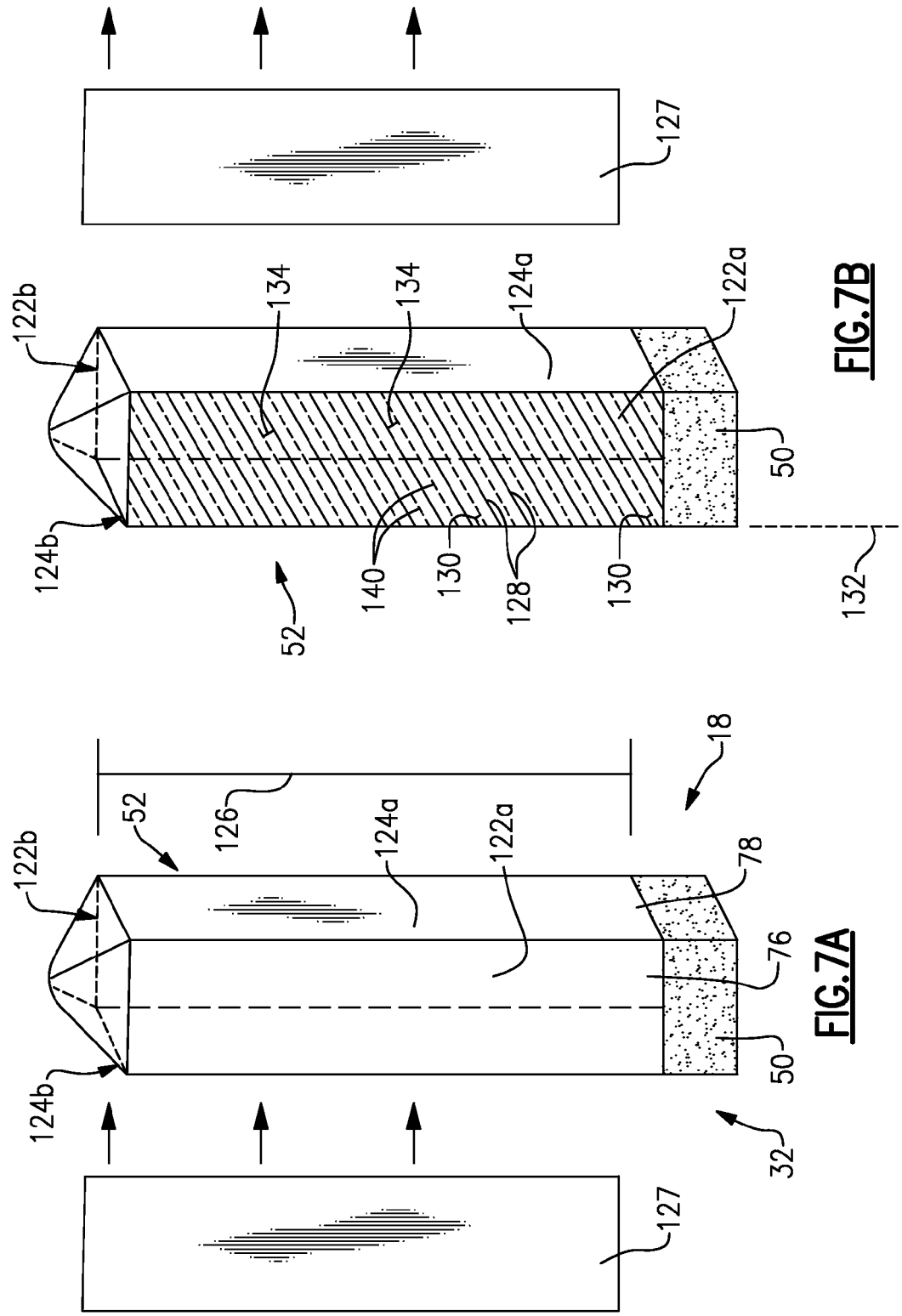

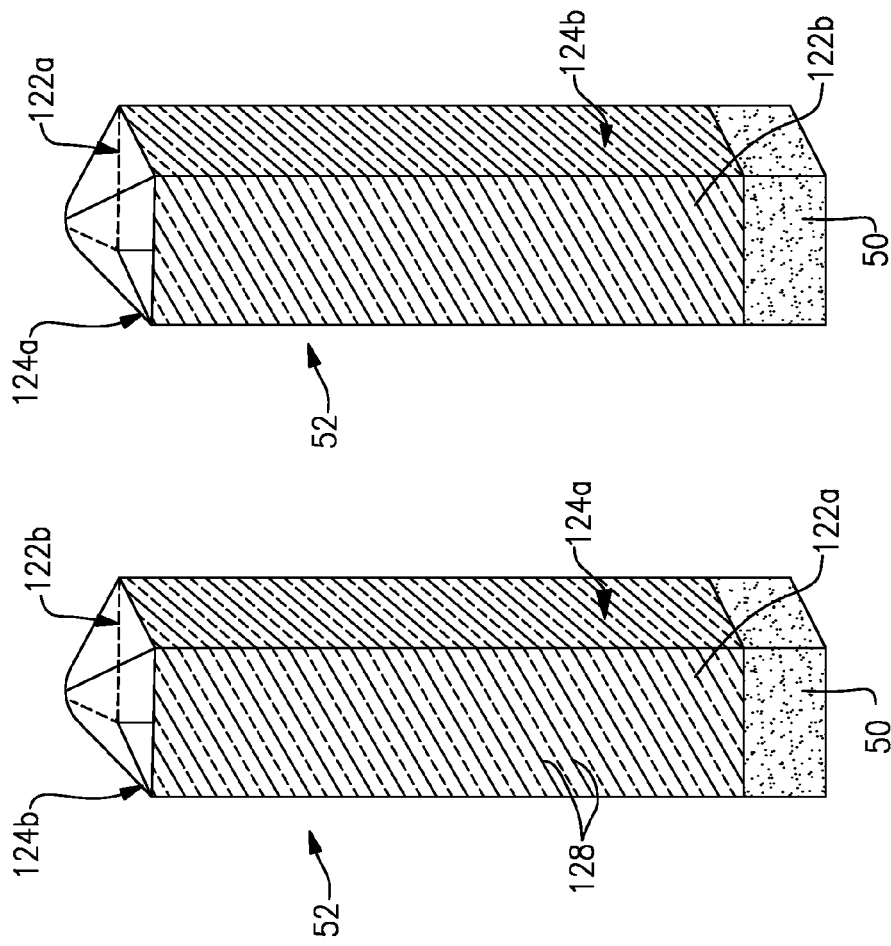
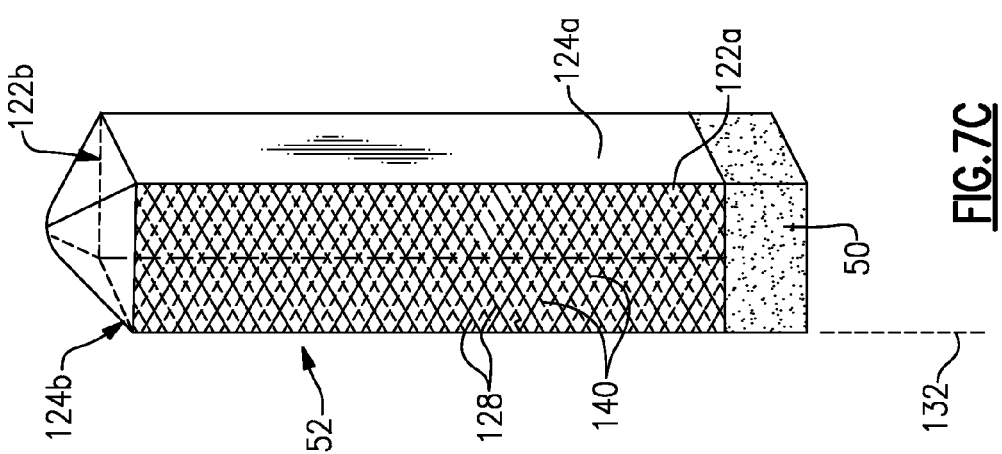
FIG.7D
FIG.7C

KNURLED MULTIPLE CONDUCTOR WINDINGS

BACKGROUND

This disclosure relates generally to electric machines, including generators and motors having stators with electrical windings.

Electric machines, such as electric generators, are generally used to convert mechanical energy into electrical energy. Electric machines generally include a stator and a rotor in register therewith. The stator includes electrical windings and movement of the rotor relative to the stator causes an alternating current ("AC") to move through the windings. An electrical connection is provided between the windings and various components, such as a power bus, to allow the AC current to flow between the stator and the various components serving as loads.

In many circumstances multiple windings need to be brazed together using braze alloy between the windings.

SUMMARY

An example electric machine includes a stator disposed about an axis having a plurality of slots. The electric machine also includes a plurality of windings each having a first portion and a second portion. At least two of the plurality of windings are at least partially disposed within each of the plurality of slots. At least one of the first portion or second portion of at least one of the plurality of windings of each slot includes a first exposed end with a surface having a plurality of grooves, the surface in contact with a second exposed end of at least one other winding of the same slot. The first exposed end and second exposed end form a joint between the plurality of windings. A braze material is dispersed in a plurality of grooves disposed between the first exposed end and the second exposed end.

An example stator includes a plurality of slots, a first winding and a second winding. The first winding has an exposed end with a first surface. The second winding has an exposed end with a second surface. The first winding and second winding have generally rectangular cross sections and are inserted at least partially into one of the plurality of slots. A joint between said first surface and said second surface includes at least one of said first surface or said second surface having a plurality of grooves. A braze material is disposed between said first surface and said second surface.

An example winding set includes a plurality of windings each including a first portion with an exposed end and a second portion with an exposed end. Each of the first portions is aligned to have at least one side facing and contacting another first portion. Each of the second portions is also aligned to have at least one side facing and contacting another second portion. At least one joint is formed by the first portions of the plurality of windings and at least one joint is formed by the second portions of the plurality of windings. Each joint includes an exposed end having at least one surface. A plurality of grooves are formed on both of at least one surface of facing and contacting exposed ends of the first portions and at least one surface of facing and contacting exposed ends of the second portions. Braze alloy is dispersed in each of the plurality of grooves.

An example method for installing knurled windings includes providing a plurality of windings with generally rectangular cross sections. The surface of a first exposed end of at least one of the windings is knurled and aligned with a second exposed end of another winding. The aligned exposed ends of the plurality of windings are brazed together. The plurality of windings is then at least partially inserted into each of a plurality of slots of a stator such that the windings are stacked down the longitudinal side of the slot.

These and other features can be best understood from the following specification and drawings, the following of which is a brief description.

BRIEF DESCRIPTION OF THE DRAWINGS

FIG. 1 is a schematic view of an example electric machine assembly.

FIG. 3A is a perspective view of an example winding.

FIG. 3B is a close-up perspective view of the knuckle portion of the example winding of FIG. 3A.

FIG. 4 is a side cross sectional view of a slot with windings of the example stator of FIG. 2.

FIG. 7A is a perspective side view of an example exposed end of a winding before knurling.

FIG. 7B is a perspective side view of an example exposed end of a winding after knurling.

FIG. 7C is a perspective side view of another example exposed end of a winding after knurling.

FIG. 7D is a perspective side view of another example exposed end of a winding after knurling with all surfaces knurled.

DETAILED DESCRIPTION

Figure 2:
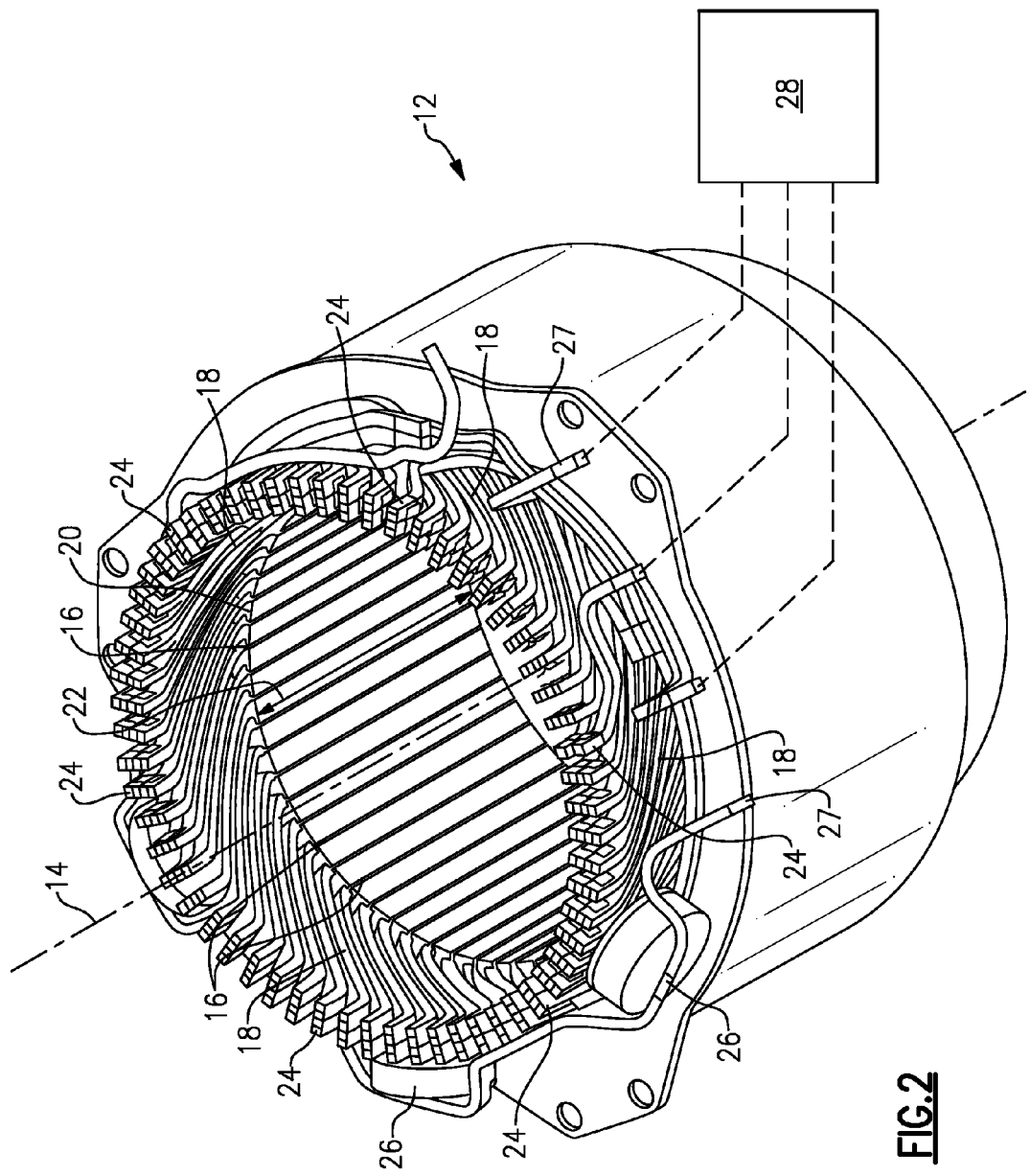
FIG. 2 is a perspective view of an example stator.

Referring to FIG. 1, an example electric machine 10, such as an electric generator or auxiliary power unit, is shown schematically. As shown, the electric machine 10 includes a stator 12 in register with a rotor 13. However, it is within the contemplation of this disclosure to use any wound stator 12 and rotor 13 arrangements, as well as an electric machine 10 having more components, or different arrangements. The electric machine 10 is driven by a prime mover 15, such as a gas turbine engine for aerospace application. As shown, a shaft 17 couples the prime mover 15 and the rotor 13. However, it is within the contemplation of this disclosure to use other prime movers and coupling arrangements. In one example, a housing assembly 11 includes an input housing 23 enclosing various components of the electric machine 10. However, it is within the contemplation of this disclosure for the housing assembly to include more components and different arrangements. In one example, the input housing 23 encloses the stator 12 and rotor 13. The shaft 17 extends into the input housing 23 to couple to the rotor 13. As shown, the input housing 23 encloses the stator 12 and rotor 13. However, it is within the contemplation of this disclosure for more components, such as thermal devices (not shown), to be enclosed in the input housing 23 and for the housing 23 to partially cover the electric machine 10.

Referring to FIG. 2, an example stator 12 is disposed about an axis 14 and includes a plurality of slots 16 and a plurality of windings 18. Each of the plurality of windings 18 has a generally rectangular cross section, shown in greater detail in FIG. 9A. In one example, the plurality of windings 18 has a generally rectangular cross section having rounded corners. At least a portion of each of the plurality of windings 18 extend into each of the plurality of slots 16. The plurality of slots 16 is located circumferentially around an inner circumference 20 of the stator 12. The plurality of slots 16 extend the length 22 of the stator 12, and is parallel to the axis 14. However, it is within the contemplation of this disclosure to use slots 16 of other lengths and orientations.

The stator 12 includes a number of jump connections 24 that are electrically connected with current transformers 26 and phase outlets 27 to provide an electrical connection between the stator 12 and another component or device 28. In one example, three pairs of jump connectors 24 are shown with each jump connector 24 of a pair 180 degrees apart. The pairs of jump connectors 24 may also be offset by 120 degrees thereby providing a three phase alternating current arrangement. However, it is within the contemplation of this disclosure to use other AC phase arrangements and numbers of jump connectors 24.

Referring to FIGS. 3A and 3B, with continued reference to FIG. 2, an example winding 18 includes a knuckle 30, a first portion 32, and a second portion 34. The knuckle 30 is formed by performing a twist and bend of a portion 31 of the winding 18 to create an end to insert into a slot 16 of the stator. By creating the knuckle 30 through twisting and bending the winding 18, a separate first portion 32 and second portion 34 of the winding 18 are created. However, even though the winding 18 is twisted at the knuckle 30 to create an angle, allowing both the first portion 32 and second portion 34 to extend in the same direction, both the first portion 32 and second portion 34 maintain the generally rectangular cross-section. The winding 18 is made of electrically conductive material, such as copper or other similarly conductive material.

Referring for FIG. 4, with continued reference to FIGS. 2, 3, and 4, a plurality of windings 18 is at least partially inserted into each of the plurality of slots 16. Each of the plurality of windings 18 is inserted such that the knuckle 30 is inserted first and moves to the bottom end 40 of each slot 16. Both the first portion 32 and the second portion 34 of each winding 18 are located in the same slot 16. The first portion 32 of each winding 18 is positioned at a position radially inward of the second portion 34 relative to the axis 14. Both the first portion 32 and second portion 34 extend out from the bottom end 40 of each slot 16. In one example, two windings 18 are inserted into each slot 16. However, it is within the contemplation of this disclosure for each slot 16 to hold more than two windings 18.

The at least two windings 18 inserted into each slot 16, forming a matched winding set 120, are aligned such that there is minimal or no space separating the at least two windings 18. Within each of the plurality of slots 16, each first portion 32 of each winding 18 within the same slot 16 is grouped to form an inner group 46, and each second portion 34 of each winding 18 within the same slot is grouped to form an outer group 48.

Figure 5:
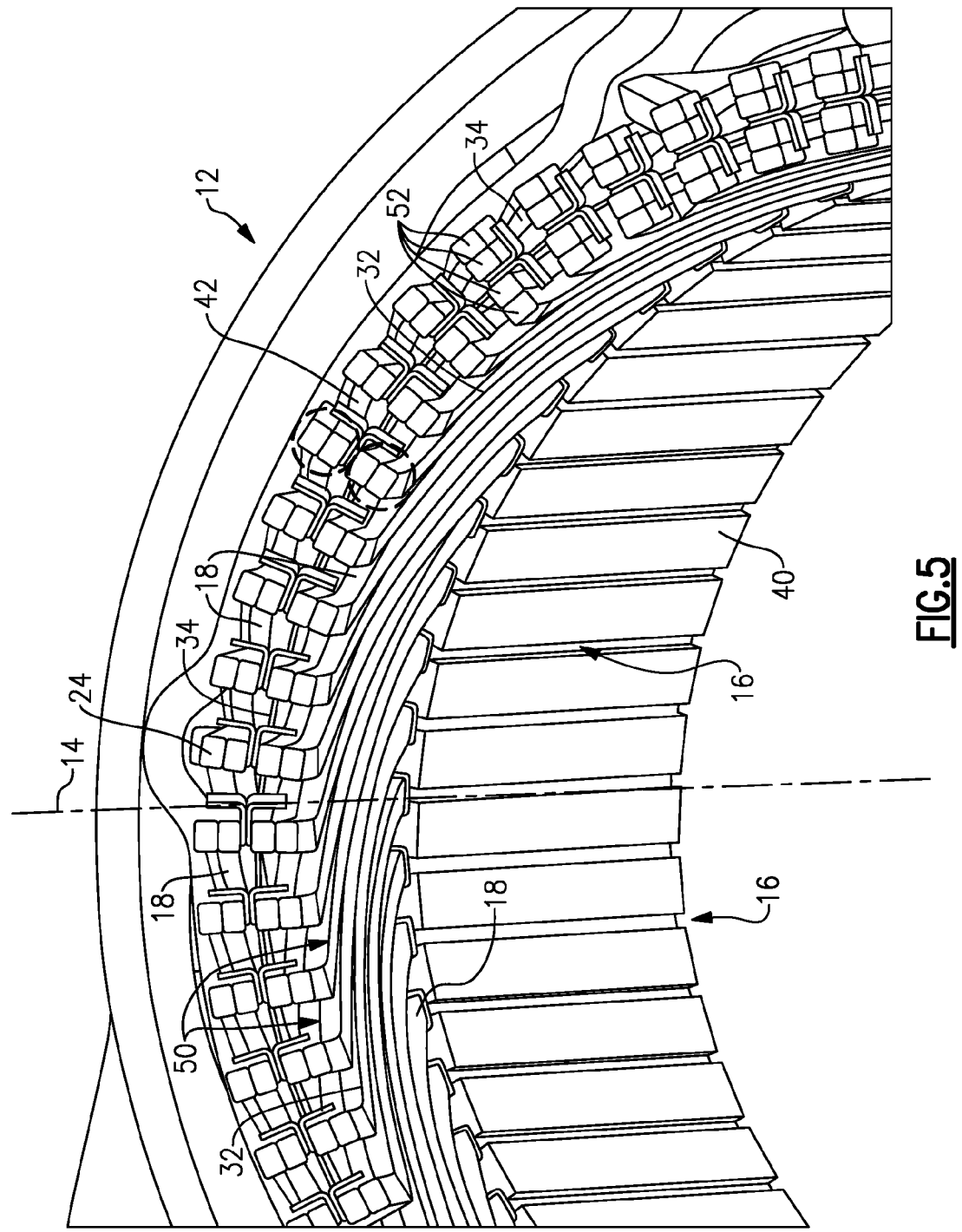
FIG. 5 is a close-up perspective view of a portion of the example stator of FIG. 2.

Referring to FIG. 5, with continued reference to FIGS. 2 and 4, at least a part of the first portion 32 and a part of the second portion 34 extend out beyond the plurality of slots 16. Each of the plurality of windings 18 are enclosed in non-conductive insulation 50. However, the insulation 50 is stripped at the exposed ends 52 of the windings 18, allowing the windings 18 to electrically contact. Therefore, the exposed ends 52 are configured to allow electrical current to flow through connected windings 18.

Jump connectors 24 are provided at certain points around the stator 12 to provide a way for the electrical current to exit the stator 12. The jump connectors 24 are electrically conductive and are electrically connected to the windings 18 by replacing part of the second portion 34 of one of the windings 18. The jump connecter 24 is brazed to second portions 34. The brazing consists of creating a metallurgical bond between a filler metal and the surfaces of two metals being joined, as known. However, it is within the contemplation of this disclosure to use other methods of joining windings 18 and jump connectors 24. By electrically connecting the jump connector 24 to the second portions 34, the jump connector 24 is able to receive current from a plurality of windings 18 and move the current from the stator 12 as described above.

Figure 6:
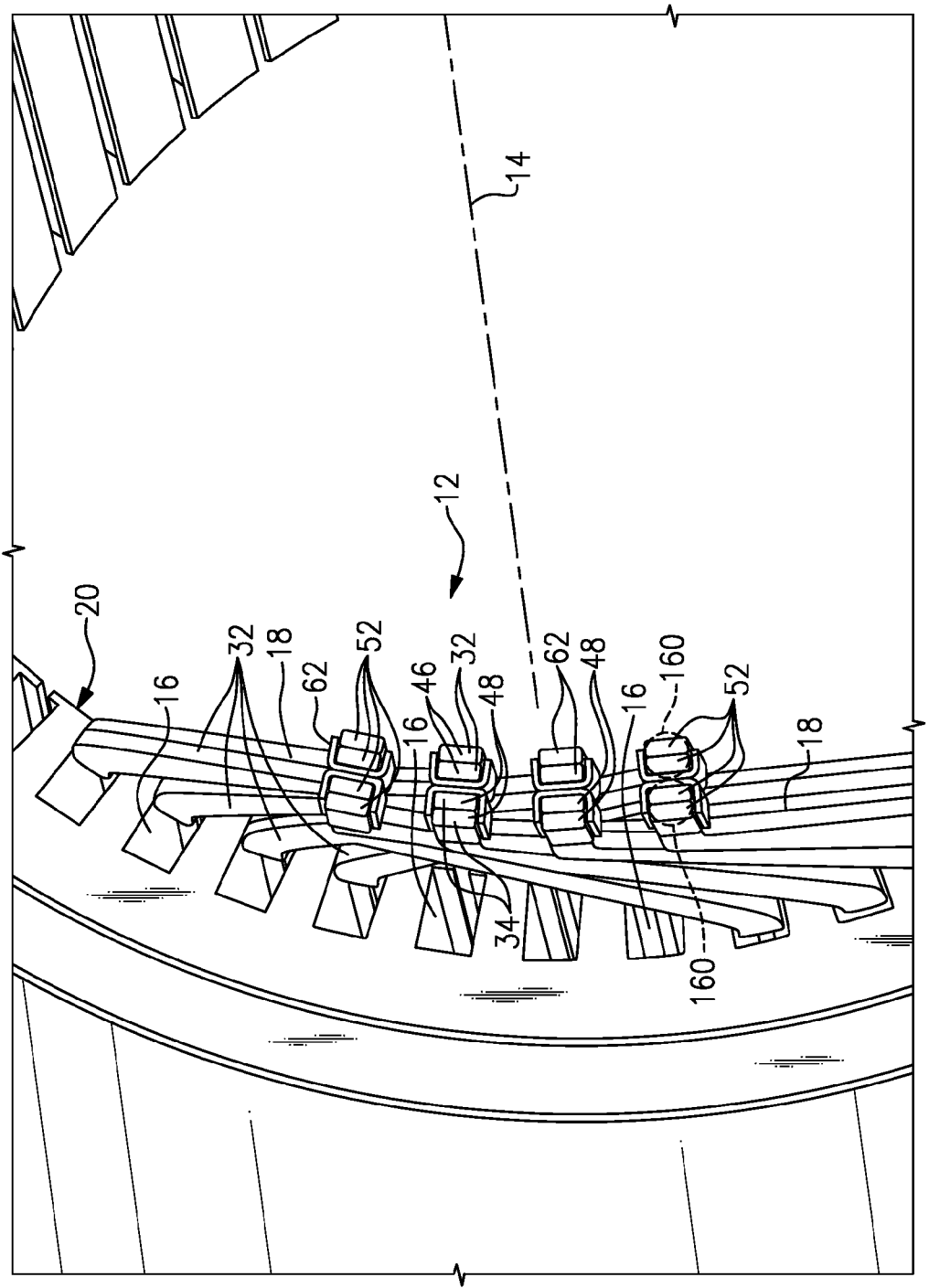
FIG. 6 is a perspective top view of the example stator of FIG. 2 including the winding portions not within a slot

Referring to FIG. 6, with continued reference to FIGS. 2 and 5, the portion of the windings 18 located above the plurality of slots 16 are shown. As each winding 18 extends out of the slot 16, the winding 18 is bent so that the windings 18 are generally aligned with the inner circumference 20 of the stator 12, allowing non-adjacent first portions 32 and second portions 34 to align generally parallel to each other for electrical connection. The first portion 32 of each of the plurality of windings 18 are located radially inward of the second portions 34 of each of the plurality of windings 18. The alignment of non-adjacent first portions 32 and second portions 34 allows for continual current flow through the windings 18 without short circuiting the windings 18.

An inner group 46 and an outer group 48 are formed from the plurality of windings 18 common to the same slot 16. In one example, the inner group 46 is a pair of first portions 32 and the outer group 48 is a pair of second portions 34. However, it is within the contemplation of this disclosure for other numbers of first portions 32 and second portions to comprise the inner groups 46 and outer groups 48. The exposed ends 52 of the inner groups 46 and outer groups 48 are aligned such that each inner group 46 is electrically coupled to an outer group 48 from a non-adjacent slot 16. The aligned inner groups 46 and outer groups 48 are brazed together at the exposed ends 52 to form a braze joint 160.

In one example, a braze clip 62 is used to aide in electrically connecting the inner groups 46 and outer groups 48. The braze clip 62 is made of a conductive material and allows current to flow between the inner group 46 and outer group 48. The braze clip 62 may be an H-clip, as shown. However, it is within the contemplation of this disclosure to use other configurations of clips as needed based on the alignment of the inner groups 46 and outer groups 48. In one example, the braze clip 62 is a braze alloy, such as AWS A5.8 BCup-5. The use of the braze clip 62 results in the inner group 46 being electrically and physically clamped to the outer group 48 to allow current flow between windings 18.

Referring to FIG. 7A, with continued reference to FIGS. 3A and 5, the plurality of windings 18 maintain a generally rectangular cross section defined by pairs of opposing sides 76, 78. Each side 76, 78 of a pair may be parallel to each other and perpendicular to each side, 78, 76 respectively, of the other opposing pair. As shown, the plurality of windings 18 maintain a generally rectangular cross section while having rounded corners connecting the opposing pairs of sides 76, 78. It is within the contemplation of this disclosure for the plurality of windings to maintain a generally rectangular cross section in other arrangements which do not change the alignment of the opposing pairs of side 76, 78.

Each pair of sides 76, 78 includes an exposed end 52 of an example winding 18 that is part of the first portion 32 and has a pairs of surfaces, 122*a-b* and 124*a-b* respectively, free of the insulation 50. Although only the first portion 32 is illustrated, it is within the contemplation of this disclosure that the exposed end 52 would be the same for the second portion 34 of an example winding 18 depending on alignment of the windings 18, as described in greater detail in FIGS. 9A and 9B. The surface 122*a-b*, 124*a-b* of the exposed end 52 has a depth 126 measured from the top of the exposed end 52 to the beginning of the insulation 50. In one example, the depth 126 is within the range of 0.650-0.850 inches (16.51-21.59 mm). However, it is within the contemplation of this disclosure to use other depths 126.

A tool, such as a knurling tool 127, is applied to at least one surface 122*a-b*, 124*a-b* of the exposed end 52 to knurl the surface 122, 124 to form a plurality of grooves 128 and a plurality of ridges 140 (Shown in FIG. 7B). For illustrative purposes, the example knurling tool 127 is shown only applying to one surface 122*a*; however, it is within the contemplation of this disclosure for the knurling tool 127 to be applied to any or all of the surfaces 122*a-b*, 124*a-b*. The knurling tool 127 is configured to knurl the surface 122*a* when applied such that a pattern of grooves 128, or cuts, and a plurality of ridges 140 (illustrated in FIGS. 7B, 7C, and 7D), are formed on the surface 122*a*. The knurling tool 127 presses into the surface 122*a*, displacing the core material. When braze alloy is applied, it flows into the plurality of grooves 128 of the knurled surface 122*a* to braze the inner group 46 of the plurality of windings 18 and the outer group 48 of the plurality of windings.

Referring to FIG. 7B, with continued reference to FIG. 7A, the knurling tool 127 is removed after forming a knurled surface 122*a*, leaving a plurality of grooves 128 and a plurality of ridges 140 on the surface 122*a* beyond the insulation 50. For illustrative purposes, only surface 122*a* is knurled; however, it is within the contemplation of this disclosure for any of the surfaces 122*a-b*, 124*a-b* to be knurled. As shown, the grooves 128 and ridges 140 are formed by the knurling tool 127; however, it is within the contemplation of the invention form the grooves 128 by other means including at least stamping and molding.

In one example, the plurality of grooves 128 and the plurality of ridges 140 are disposed on the surface 122*a* in a straight knurl pattern. Each of the plurality of grooves 128 and plurality of ridges 140 is disposed at a 45° angle 130 relative to an axis 132. However, it is within the contemplation of this disclosure for the plurality of grooves 128 and plurality of ridges 140 to be disposed at different angles 130. The plurality of grooves 128 are equally spaced apart a distance 134 across the surface 122*a*. However, it is within the contemplation of this disclosure to space the plurality of grooves 128 non-uniformly. In one example, the grooves 128 are spaced at 22-28 grooves 128 per inch and the ridges 140 are spaced at 22-28 ridges 140 per inch. The plurality of grooves 128 is disposed along the entire depth 126 of the exposed end 52. A person of ordinary skill in the art can determine ideal pattern or non-pattern alignments of the plurality of grooves 128 using teachings herein.

Referring to FIG. 7C, with continued reference to FIGS. 7A and 7B, in one example, the plurality of grooves 128 and the plurality of ridges 140 are disposed on the surface 122*a* of the exposed end 52 in a diamond knurl pattern beyond the insulation 50. For illustrative purposes, only surface 122*a* is knurled; however, it is within the contemplation of this disclosure for any of the surfaces 122*a-b*, 124*a-b* to be knurled.

Referring to FIG. 7D, with continued reference to FIGS. 7A and 7B, in one example, the plurality of grooves 128 and the plurality of ridges 140 are disposed on each surface 122*a-b*, 124*a-b* of the exposed end in a straight knurl pattern beyond the insulation 50.

Figure 8:
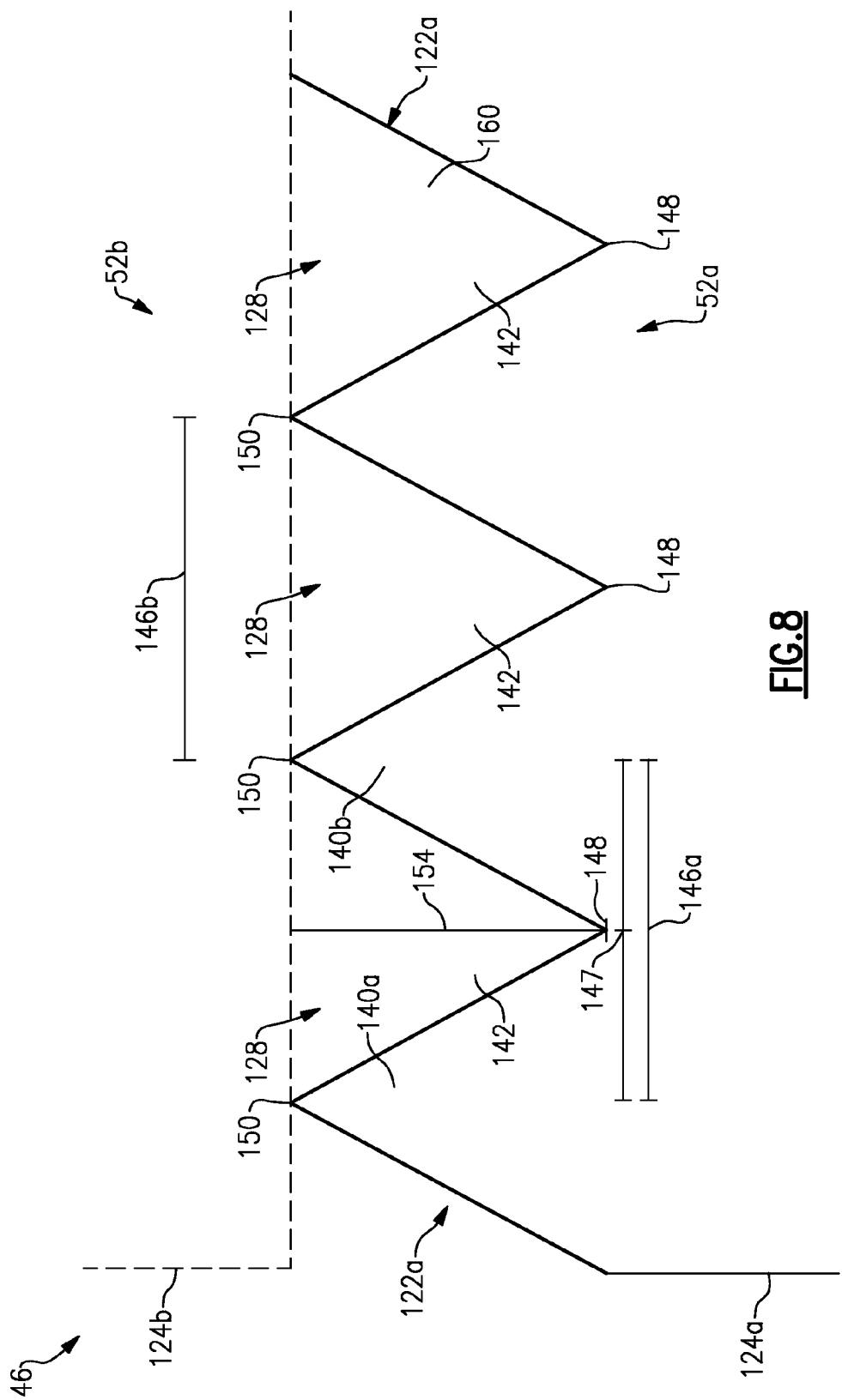
FIG. 8 is a cross-sectional side view of an example knurled surface of an exposed end.

Referring to FIG. 8, with continued reference to FIG. 7B, the plurality of grooves 128 displaces part of the surface 122*a* of the first exposed end 52*a*, forming ridges 140. Each groove 128 has a cup 142, or area where the core is displaced due to knurling, below the plane of the surface 122*a*. Ridges 140 are formed above the plane of the surface 122*a* due to the displaced material of the cup 142. A gap 154 of the groove 128 measures from the peak 150 of each of the corresponding ridges 140*a-b* to the base point 148 of each groove 128. However, it is within the contemplation of this disclosure to use other formations of grooves 128. The base point 148 is located halfway between peaks 150 of the corresponding ridges 140*a-b*. In one example, when the surface 122*a* of the second exposed end 52*b* is aligned to contact the first exposed end 52*a*, each of the peaks 150 contact the surface 122*a* of the second exposed end 52*b*, leaving the gap 154 between the base point 148 of each groove 128 and the surface 122*a* of the second exposed end 52*b*. For illustrative purposes and clarity, dimensions of FIG. 8 are enlarged and are not drawn to scale either literally, nor with relation to each other.

In one example, each groove 128 has a width 146*a*, equal to the distance 146*b* between each ridge 140, and in the range of 0.035-0.045 inches (0.889-0.1143 mm). The first portion 46 includes at least two ridges 140*a-b* each also having a width 144 in the range of 0.035-0.045 inches (0.889-1.143 mm). However, it is within the contemplation of this disclosure to use different spacing alignments.

In one example, the base point 148 is located at a position 147 that is exactly halfway between corresponding peaks 150 of the plurality of ridges 140, the position 147 in the range of 0.0175-0.0225 inches (0.4445-0.5715 mm) away from each corresponding peak 150. However, it is within the contemplation of the disclosure to use positions 147 at different distances between peaks 150.

In one example, the gap 154 is in the range of 0.0003-0.007 inches (0.0762-0.1778 mm) creating a gap 154 between the surface 122*a* of a first exposed end 52*a* and the surface 122*a* of a second exposed end 52*b* of an inner group 46. Although an inner group 46 is shown, it is within the contemplation of the disclosure for this arrangement to be applicable to an outer group 48 as well as for the pair of surfaces 124*a-b* of each exposed end to be knurled and aligned, as will be shown in greater detail in FIGS. 9A and 9B.

Figure 9A:
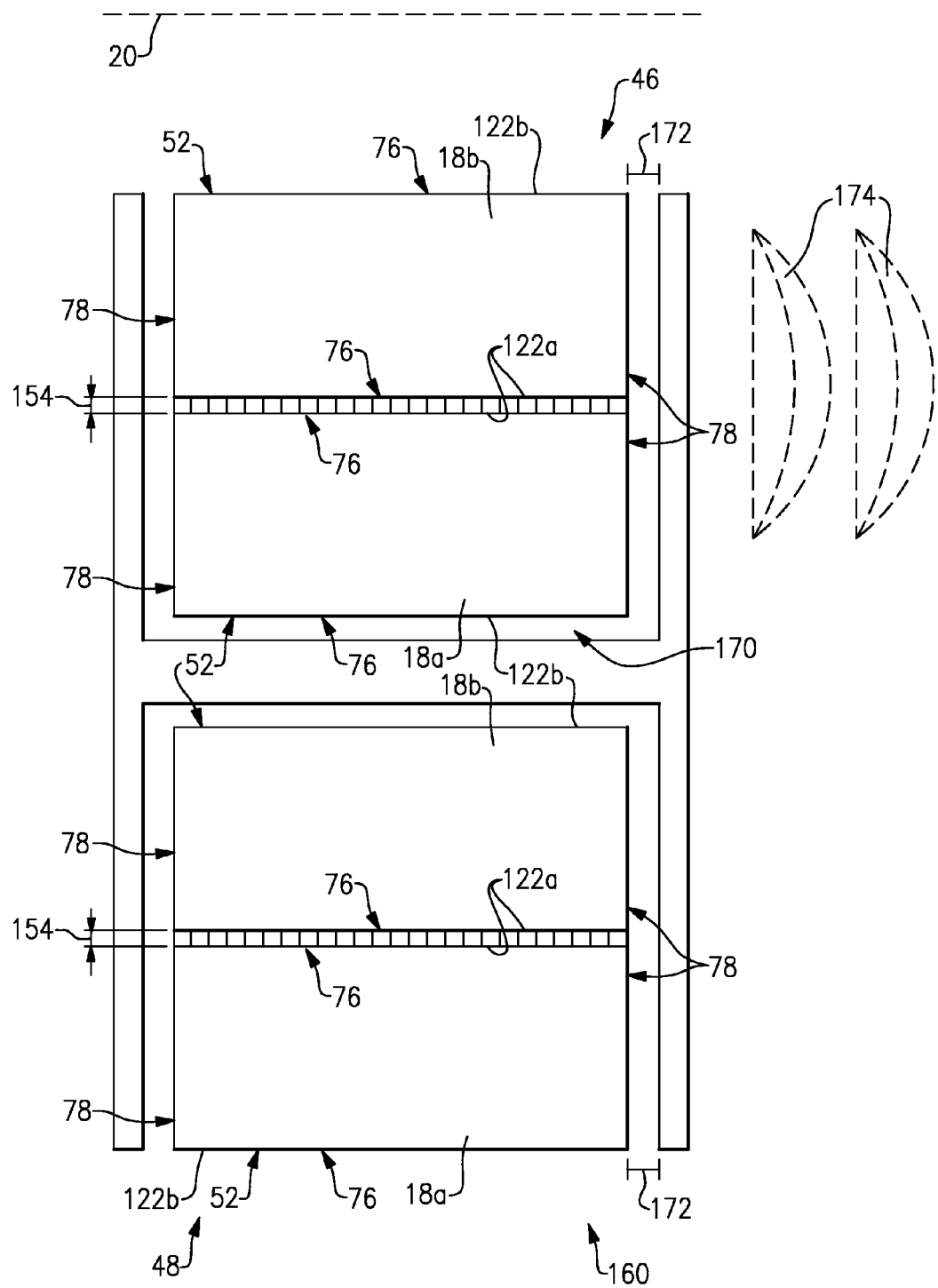
FIG. 9A is a perspective top view of an example alignment of the plurality of windings within a braze clip.

Referring to FIG. 9A, with continued reference to FIGS. 6, 7A-C, and 8, a braze joint 160 is formed between the inner group 46 of a slot 16. Another braze joint 160 is formed between the outer group 48 of another slot. In this example, the pair of first sides 76 are longitudinal sides, or a long side of the rectangular cross sections of each winding 18 and are aligned generally parallel to the inner circumference 20 of the stator 12.

The windings 18 are further aligned such that at least one of the first sides 76 of each of the plurality of windings 18*a-b* are facing and in contact with at least one other first side 76 of another winding 18. The alignment causes at least one of the surface 122*a-b* of a first winding 18*a* to be facing and in contact with one of the surface 122*a-b* of a second winding 18*b* for each of the inner group 46 and the outer group 48. In this example, the surface 122*a* of at least one of the plurality of windings 18 is knurled to create a gap 154 between contacting windings 18*a-b* of the inner group 46 and the outer group 48. In this example, the gap 154 is enlarged for illustrative purposes. Although the surface 122a of each the windings 18 are shown facing and contacting, it is within the contemplation of this invention that a surface 122a of a first winding 18a may face and contact another surface 122b of a second winding 18b. Although each of the inner group 46 and the outer group 48 has windings 18a-b with one surface 122a knurled, it is within the contemplation of this disclosure for a winding 18 to have more than one surface 122a-b, 124a-b knurled to allow use of a plurality of windings 18.

In one example, one of the first winding 18a and the second winding 18b of each of the inner group 46 and the outer group 48 has a knurled surface 122a. The knurled surface 122a creates a gap 154 in the range of 0.0003-0.007 inches (0.0762-0.1778 mm) between the exposed end 52 of the first winding 18a and the exposed end 52a of the second winding 18b. The gap 154 allows braze alloy to flow between the windings 18a-b, and when brazed, form a braze joint 160 between the exposed ends 52 of the windings 18a-b with increased strength as well as proper wetting and fill as the specification of the gap 154 is determined based upon the surface tension of the braze alloy.

In another example, both the first winding 18a and second winding 18b of each of the inner group 46 and the outer group 48 have a knurled surface 122a. The first winding 18a and second winding 18b are brazed together with a gap 154 in the range of 0.009-0.014 inches (0.2286-0.3556 mm). The gap 154 allows braze alloy to flow between the windings 18a-b, and when brazed forming a braze joint 160 between the exposed ends 52 of the windings 18a-b with increased strength as well as proper wetting and fill as the specification of the gap 154 is determined based upon the surface tension of the braze alloy.

The inner group 46 of windings 18 and outer group 48 of windings 18 are disposed in a braze clip 62. The braze clip 62 allows current to flow between the inner group 46 and outer group 48. The braze clip 62 may be an H-clip, as shown. However, it is within the contemplation of this disclosure to use other configurations of clips 62 as needed based on the alignment of the inner groups 46 and outer groups 48. The use of the braze clip 62 results in the inner group 46 being electrically and physically clamped to the non-adjacent outer group 48 to allow current flow between the plurality of windings 18.

In one example, a cavity 170 is provided between the braze clip 62 and the plurality of windings 18. The cavity 170 is spaced a distance 172 apart from the plurality of windings 18 at all regions around the plurality of windings 18. In this example, the distance 172 is within the range of 0.006-0.010 inches (0.1524-0.254 mm). However, it is within the contemplation of this disclosure for other distances 172 or a distance of 0 mm to be used.

In one example, after the inner group 46 and outer group 48 are inserted into the braze clip 62 and brazed, the tips 174 of the exposed ends 52 are cut off. The braze clip 62 is positioned at the end of the exposed ends 52 and the removal of the tips 174 reduces weight of the stator 12.

Figure 9B:
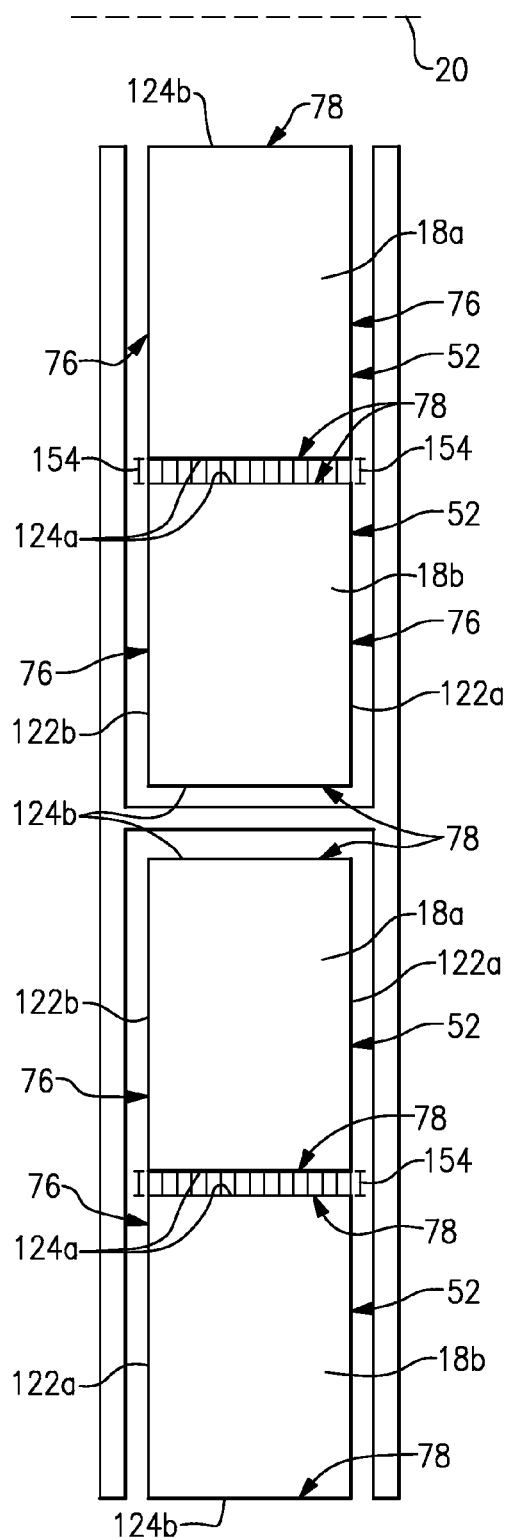
FIG. 9B is a perspective top view of another example alignment of the plurality of windings within a braze clip.

Referring to FIG. 9B, with continued reference to FIGS. 6 and 7A-C, a braze joint 160 is formed between the inner group 46 of a slot 16. Another braze joint 160 is formed between the outer group 48 of another slot. In this example, the pair of second sides 78 are non-longitudinal sides, or a short side of the rectangular cross sections of each winding 18 and are aligned generally parallel to the inner circumference 20 of the stator 12.

The windings 18 are further aligned such that at least one of the second sides 78 of each of the plurality of windings 18a-b are facing and in contact with another second side 78 of another winding 18. The alignment causes at least one of the surface 124a-b of a first winding 18a to be facing and in contact with one of the surface 124a-b of a second winding 18b for each of the inner group 46 and the outer group 48. In this example, the surface 124a of at least one of the plurality of windings 18 is knurled to create a gap 154 between contacting windings 18a-b of the inner group 46 and the outer group 48. In this example, the gap 154 is enlarged for illustrative purposes. Although the surface 124a of each the windings 18 are shown facing and contacting, it is within the contemplation of this invention that a surface 124a of a first winding 18a may face and contact another surface 124b of a second winding 18b. Although each of the inner group 46 and the outer group 48 has windings 18a-b with one surface 124a knurled, it is within the contemplation of this disclosure for a winding 18 to have more than one knurled surface to allow use of a plurality of windings 18.

In one example, one of a first winding 18a and second winding 18b of each of the inner group 46 and the outer group 48 have a knurled surface 124a. The knurled surface creates a gap 154 in the range of 0.0003-0.007 inches (0.0762-0.1778 mm) between the exposed end 52 of the first winding 18a and the exposed end 52a of the second winding 18b. The gap 154 allows braze alloy to flow between the windings 18a-b, and when brazed, form a braze joint 160 between the exposed ends 52 of the windings 18a-b with increased strength as well as proper wetting and fill as the specification of the gap 154 is determined based upon the surface tension of the braze alloy.

In one example, both the first winding 18a and the second winding 18b of each of the inner group 46 and the outer group 48 have a knurled surface 124a. The knurled surfaces 124a create a gap 154 in the range of 0.009-0.014 inches (0.2286-0.3556 mm) between the exposed end 52 of the first winding 18a and the exposed end 52a of the second winding 18b. The gap 154 allows braze alloy to flow between the windings 18a-b, and when brazed, form a braze joint 160 between the exposed ends 52 of the windings 18a-b with increased strength as well as proper wetting and fill as the specification of the gap 154 is determined based upon the surface tension of the braze alloy.

In operation, the exposed ends 52 are knurled by a knurling tool 127 to create a gap 154 between the plurality of windings 18. The specifications of the grooves 128 formed by knurling a surface 122a-b, 124a-b are determined at least partially by how much clearance between the plurality of windings 18 is needed. Clearance between the plurality of windings 18 depends upon the surface tension of the braze alloy, which efficiently bridge different gaps 154 depending on the braze alloy being used. The braze alloy is able to flow into the gaps 154 during brazing to provide effective brazing of the plurality of windings 18. The strength of the braze joints 160 is increased while providing proper wetting and fill of the braze joint 160. The braze joints 160 of the plurality of windings 18 and the braze clip 62 allow electrical current to flow through the plurality of windings 18 of the stator 12.

Figure 10:
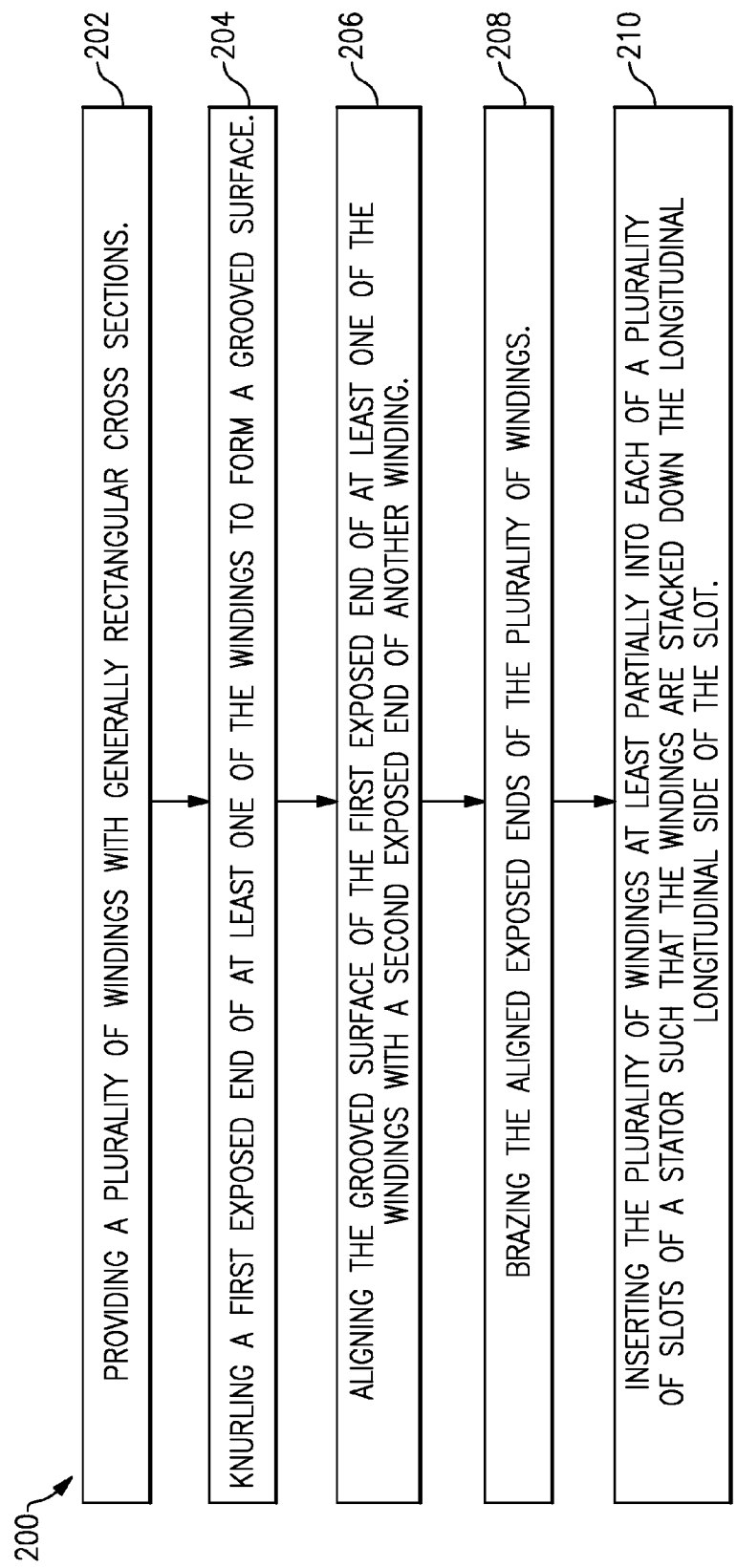
FIG. 10 is an example method for installing knurled windings within a stator

Referring to FIG. 10, a method for installing knurled windings within a stator 200 includes providing plurality of windings with generally rectangular cross sections 202. A first exposed end of at least one of the windings is knurled forming a grooved surface 204. The grooved surface of the first exposed end of at least one of the plurality of windings is aligned with a second exposed end of another winding 206. The aligned exposed ends of the plurality of windings are brazed together 208. The plurality of windings is at least partially inserted into each of a plurality of slots of a stator such that the windings are stacked down the longitudinal side of the slot 210.

Although preferred embodiments have been disclosed, a worker of ordinary skill in this art would recognize that certain modifications would come within the scope of this disclosure. For that reason, the following claims should be studied to determine the true scope and content of this disclosure.

What is claimed is:

1. A stator comprising:
   a plurality of slots;
   a first winding having an exposed end with a first surface;
   a second winding having an exposed end with a second surface, the first winding and second winding with generally rectangular cross sections and inserted at least partially into one of the plurality of slots;
   a joint between said first surface and said second surface, said joint including at least one of said first surface or said second surface having a plurality of grooves; and
   a braze material disposed between said first surface and said second surface, wherein each of the first winding and the second winding include a first portion and a second portion extending from a knuckle, the first portion and the second portion at least partially disposed in a first slot of the plurality of slots.

2. The stator of claim 1, wherein the first portion and the second portion of each of the first winding and the second winding are joined at a knuckle, wherein each knuckle is at least partially disposed within the first slot.

3. The stator of claim 1, wherein the braze material is AWS A5.8 BCup-5.

4. The stator of claim 1, wherein each of the plurality of grooves is between a peak of a first ridge and a peak of a second ridge, the peaks in the range of 0.035-0.045 inches (0.889-1.143 mm) apart.

5. The stator of claim 4, wherein each of the plurality of grooves includes a base point halfway between the peak of the first ridge and the peak of the second ridge.

6. The stator of claim 1, wherein each exposed end is in the range of 0.650-0.850 inches (16.51-21.59 mm).

7. The stator of claim 1, wherein the plurality of grooves are spaced apart non-uniformly.

8. The stator of claim 1, wherein the each of the plurality of grooves has a width in the range of 0.035-0.045 inches (0.889-1.143 mm).

9. The stator of claim 1, wherein the plurality of grooves are formed by a knurling tool.

10. An electric machine comprising:
    a stator disposed about an axis having a plurality of slots; and
    a plurality of windings
       each of said plurality of windings having
       a first portion and
       a second portion,
    wherein at least two of said plurality of windings are at east partially disposed within each of the plurality of slots,
    wherein at least one of the first portion or second portion of at least one of the plurality of windings of each slot includes a first exposed end with a surface having a plurality of grooves, the surface in contact with a second exposed end of the same portion of at least one other winding of the same slot, the first exposed end and second exposed end forming a joint of the plurality of windings,
    wherein a braze material is flowed into a plurality of grooves disposed between the first exposed end and the second exposed end and formed by a knurled surface of the first exposed end, wherein the first portion and the second portion of each of winding are at least partially disposed in the same slot, the first portion and second extending from a knuckle.

11. The electric machine of claim 10, wherein the plurality of grooves are equally spaced apart.

12. The electric machine of claim 10, wherein the plurality of grooves of the surface form a straight knurl pattern or a diamond knurl pattern.

13. The electric machine of claim 10, wherein the first portions of the plurality of windings in each slot form an inner group and the second portions of the plurality of windings in each slot form an outer group, wherein each inner group is electrically coupled to the outer group from a non-adjacent slot.

14. The electric machine of claim 10, wherein at least a portion of each of the plurality of windings is enclosed in non-conductive insulation.

15. An electric machine comprising:
    a stator disposed about an axis having a plurality of slots; and
    a plurality of windings
       each of said plurality of windings having
       a first portion and
       a second portion,
    wherein at least two of said plurality of windings are at least partially disposed within each of the plurality of slots,
    wherein at least one of the first portion or second portion of at least one of the plurality of windings of each slot includes a first exposed end with a surface having a plurality of grooves, the surface in contact with a second exposed end of the same portion of at least one other winding of the same slot, the first exposed end and second exposed end forming a joint of the plurality of windings,
    wherein a braze material is flowed into a plurality of grooves disposed between the first exposed end and the second exposed end and formed by a knurled surface of the first exposed end, wherein at least one jump connector is configured to connect at least one of the plurality of windings, disposed in one of the plurality of slots of the stator, to a component, wherein the at least one jump connector includes three pairs of jump connectors, wherein each jump connector of a pair is 180 degrees offset.

16. The electric machine of claim 15, wherein each jump connector is brazed to one of the second portions.

17. An electric machine comprising:
    a stator disposed about an axis having a plurality of slots; and
    a plurality of windings
       each of said plurality of windings having
       a first portion and
       a second portion,
    wherein at least two of said plurality of windings are at least partially disposed within each of the plurality of slots,
    wherein at least one of the first portion or second portion of at least one of the plurality of windings of each slot includes a first exposed end with a surface having a plurality of grooves, the surface in contact with a second exposed end of the same portion of at least one other winding of the same slot, the first exposed end and second exposed end forming a joint of the plurality of windings,
    wherein a braze material is flowed into a plurality of grooves disposed between the first exposed end and the second exposed end and formed by a knurled surface of the first exposed end, wherein the first portions of the plurality of windings in each slot form an inner group and the second portions of the plurality of windings in each slot form an outer group, the plurality of inner groups of a first slot and the plurality of outer groups of a second slot are brazed to a plurality of braze clips to provide an electrical connection between the inner group and the outer group.

18. The electric machine of claim 17, wherein the plurality of windings have a generally rectangular cross-section.

19. The electric machine of claim 18, wherein the surface creates a gap between the first exposed end and a second exposed end in the range of 0.0003-0.007 inches (0.0762-0.1778 mm).

20. The electric machine of claim 18, wherein the second exposed end includes a surface having a plurality of grooves.

21. The electric machine of claim 20, wherein the surface of the first exposed end and the surface of the second exposed end forms a gap between the first exposed end and the second exposed end in the range of 0.009-0.014 inches (0.2286-0.3556 mm).

22. The electric machine of claim 17, wherein each inner group and each outer group are aligned such that the surface is on a longitudinal side of at least one of the portions within each of the inner group and the outer group, the longitudinal sides contacting and generally perpendicular to an inner circumference of the stator.

23. The electric machine of claim 22, wherein there is a cavity between the braze clip and the windings in the range of 0.006-0.010 inches (0.1524-0.254 mm).

24. The electric machine of claim 17, wherein each inner group and each outer group are aligned such that the surface is on a non-longitudinal side of at least one of the portions within a group, the non-longitudinal sides contacting and generally perpendicular to an inner circumference of the stator.

25. The electric machine of claim 17, further including at least one jump connector configured to connect at least one of the plurality of windings, disposed in one of the plurality of slots of the stator to a component.

26. The electric machine of claim 17, wherein at least one of the at least one joint formed by the first portions of the plurality of windings and the at least one joint formed by the second portions of the plurality of windings is brazed to a braze clip configured to provide an electrical connection to a second plurality of windings.

27. The electric machine of claim 26, wherein the braze clip is an H-clip.

28. A method of installing knurled windings within a stator comprising:
providing a plurality of windings with generally rectangular cross sections;
knurling a first exposed end of at least one of the windings to form a grooved surface;
aligning the grooved surface of the first exposed end of at least one of the windings with a second exposed end of another winding;
brazing the aligned exposed ends of the plurality of windings;
inserting the plurality of windings at least partially into each of a plurality of slots of a stator such that the windings are stacked down the longitudinal side of the slot; and
brazing the exposed end of an inner group of first portions of a first slot and the exposed ends of an outer group of second portions from a second slot into a braze clip.

29. The method of claim 28, further including the step of cutting off the tips of the exposed ends.

30. The method of claim 28, further comprising the step of:
determining a gap between the first exposed end and the second exposed end based on a surface tension of a braze alloy.

* * * * *

UNITED STATES PATENT AND TRADEMARK OFFICE
CERTIFICATE OF CORRECTION

PATENT NO.        : 8,581,466 B2  
APPLICATION NO.   : 12/870263  
DATED             : November 12, 2013  
INVENTOR(S)       : Patel et al.

Page 1 of 1

It is certified that error appears in the above-identified patent and that said Letters Patent is hereby corrected as shown below:

IN THE CLAIMS:

Claim 10, column 9, line 54: "east" should read as "least"

Signed and Sealed this
Thirteenth Day of May, 2014

Michelle K. Lee
*Deputy Director of the United States Patent and Trademark Office*